United States Patent [19]

Newman

[11] Patent Number: 5,570,143
[45] Date of Patent: Oct. 29, 1996

[54] TORIC LENS WITH AXIS MISLOCATION LATITUDE

[75] Inventor: Steve Newman, Sunnybank, Australia

[73] Assignee: Capricornia Contact Lens Pty. Ltd., Springwood, Australia

[21] Appl. No.: 190,125

[22] PCT Filed: Aug. 7, 1992

[86] PCT No.: PCT/AU92/00418

§ 371 Date: Mar. 18, 1994

§ 102(e) Date: Mar. 18, 1994

[87] PCT Pub. No.: WO93/03409

PCT Pub. Date: Feb. 18, 1993

[30] Foreign Application Priority Data

Aug. 9, 1991 [AU] Australia ................... PK7675

[51] Int. Cl.⁶ ................. G02C 7/02; G02C 7/04
[52] U.S. Cl. ................. 351/176; 351/160 R; 351/160 H; 351/159; 359/711
[58] Field of Search ............... 351/160 H, 176, 351/161, 169, 160 R, 159; 359/711, 708, 642

[56] References Cited

U.S. PATENT DOCUMENTS

| | | | |
|---|---|---|---|
| 3,711,191 | 1/1973 | Tagnon | 351/169 |
| 3,722,986 | 3/1973 | Tagnon | 351/176 |
| 3,960,442 | 6/1976 | Davis et al. | 351/176 |
| 4,268,133 | 5/1981 | Fischer et al. | 351/161 |
| 4,573,774 | 3/1986 | Sitterle. | |
| 4,859,049 | 8/1989 | Muller. | |
| 5,009,497 | 4/1991 | Cohen. | |
| 5,016,977 | 5/1991 | Baude et al.. | |
| 5,061,058 | 10/1991 | Guilino et al. | 351/176 |
| 5,125,728 | 6/1992 | Newman et al. | 351/160 H |
| 5,500,695 | 3/1996 | Newman. | |

FOREIGN PATENT DOCUMENTS

| | | |
|---|---|---|
| 42023 | 12/1981 | European Pat. Off.. |
| 62178 | 10/1982 | European Pat. Off.. |
| 0375291A2 | 6/1990 | European Pat. Off.. |
| 0382620A1 | 8/1990 | European Pat. Off.. |
| 0453140A2 | 10/1991 | European Pat. Off.. |
| WO88/09950 | 12/1988 | WIPO. |
| 89/07303 | 8/1989 | WIPO. |
| 89/07281 | 8/1989 | WIPO. |
| 92/22845 | 12/1992 | WIPO. |

*Primary Examiner*—Viet Q. Nguyen
*Attorney, Agent, or Firm*—Fisher, Christen & Sabol

[57] ABSTRACT

A toric lens for axis mislocation correction has optical topography on at least one surface of the lens which induces a depth of field effect on the eye and enables the principle meridians of power on the lens to align with those on the eye of the wearer such that it compensates for mislocation error if the lens mislocates 1 degree or more. The lens is thin enough to allow sufficient oxygen transmission therethrough to provide satisfactory morphology of the eye of a wearer. The optical topography which induces the depth of field effect may comprise either aspheric topography, spline curve functions, diffractive optics using eschelets, ion impingement or bi-refringence optics.

20 Claims, No Drawings

TORIC LENS WITH AXIS MISLOCATION LATITUDE

This application is a 371 of PCT/AU92/00418 filed Aug. 7, 1992.

The present invention relates to toric lens technology and more particularly relates to a toric lens which employs non-spherical surfaces including aspheric topography which produces a depth of field effect which reduces or neutralises axis mislocation of the lens and improves the astigmatic lens axis stability latitudes.

For some years now soft and/or hard toric lenses have been manufactured to correct an ocular phenomenon known as astigmatism. In the case of this particular ocular problem the eye has more than one correctable plane of focus.

Whereas a simple ocular problem may be of a short or long sighted nature, an astigmatic eye can incorporate infinite variations of either type of defect or both. This, therefore requires a highly specialized design of lens to be fitted in order to correct this visual defect.

The major criteria involved in correcting astigmatism is accurately aligning the principle power meridians of the lens with the principle refractive meridians meridians in the eye. If this is not done accurately, a resultant misalignment error occurs (i.e. the incorrectly aligned lens powers and the refractive powers of the eye combine to create totally different powers from which the eye needs to attain correct vision) preventing proper correction of astigmatism. This accuracy is determined by how closely the axis of powers in the lens aligns with those of the eye.

As a rule the contact lens Practitioner can refract the astigmatic eye to within one degree of accuracy. The manufacturer should be able to control his lens accuracy to within 5 degrees. This is generally accepted as an industry standard. If however the lens does not position exactly on the axis when in vive then a misalignment error occurs. Even with the 5 degrees manufacturing tolerance, a misalignment error can occur but will generally be accepted by the patient if the cylindrical component of their astigmatism is relatively low (eg. around −2.00 diopters or lower).

If the lens swings 10 degrees or more in vive due to physiological forces exerted during blinking, eye turning, retropulsion of the eye during blinking or similar, then the patients vision will be compromised.

Within the industry, most manufacturers design their lenses specifically to overcome this problem. This can sometimes be at a cost to other very important criteria as for example by making the lens very thick in order to help location, but at a cost of oxygen deprivation to the cornea and a loss of comfort.

It is well known that spherical surfaced optical elements applied to the eye (both spectacle and contact lenses) will induce spherical aberration effects on the retina. Spherical aberration is a common optical phenomenon associated with spherical surfaces. Spherical aberration occurs when rays passing through the periphery of the lens are deviated more than those passing through the paraxial zone. The prismatic effect of a spherical lens is least in the paraxial zone and increases towards the periphery of the lens. It reduces the clarity and luminence of objects focussed by optical elements which are of a spherically surfaced nature. Most cameras and telescopes etc. utilise aspheric or doublet lens systems to reduce or eliminate this spherical aberration. A doublet consists of a principal lens and a somewhat weaker lens of different refractive index cemented together. The weaker lens must be of opposite power, and because it too has spherical aberration, it will reduce the power of the periphery of the principal lens more than the central zone.

Up until recently most contact lenses were manufactured with spherical surfaces due to simplicity of manufacture and as that was the only technology available. The resultant aberrations manifested in the eye were usually less important to the wearer than the improved comfort, cosmesis etc, afforded over the wearing of spectacles. Recently however, aspheric lens forms have been used more frequently to improve visual performance.

This has been particularly so in the area of bifocal lenses or multifocal lenses. Some of these lenses have been designed to reduce or eliminate the spherical aberration presented to the eye and thus form a much smaller circle of least confusion on the retina. This not only improves visual performance (as in contrast sensitivity and low level light contrast sensitivity) but also can improve depth of field depth of focus. Some other designs simply utilise aspheric/multi-aspheric or similar curves to artificially create greater "depths of field" than afforded to the patient by simply eliminating or reducing spherical aberration.

These designs create quite large "depth of field" effects by complex non-spherical optical curvatures and are generally prescribed overcorrected on the plus side to allow the patient to "artificially" accommodate for near to intermediate visual tasks.

This lens design can be manufactured by all the normal methods available to manufacturers, but will also suit more advanced technologies such as the use of bi-refringence. It is generally preferred that this technology be used on the anterior surface of the lens due to greater refractive index difference afforded by the air/lens interface, but this is not mandatory. A combination of front and back surface topography with both surfaces being changed from spherical can be utilised. So too can back surface topography changes be used effectively. This would especially suit diffractive or diffractive/Aspheric optical techniques. This is like the lens creating an Instamatic camera type effect on the eye whereby the wearer can focus cleanly on near objects and far objects with little compromise of both.

The present invention seeks to overcome the aforesaid problems by providing a toric lens which reduces or eliminates the misalignment effect which occurs when a toric lens mislocates on the astigmatic eye and which will stabilise in vivo to within a few degrees but which is still thin enough to afford the cornea enough oxygen for satisfactory morphology and to provide good comfort and good cosmesis. In the context of the present invention, a thick toric lens i.e. one which will stabilise in a satisfactory manner would have a prism or wedge peak thickness of 0.30 mm to 0.45 mm, whereas a thin version of the same lens would be around 0.15 mm to 0.25 mm.

Some designs have come close to the aspheric toric lens however they have not achieved axis mislocation correction ability according to the present invention. Usually some compromise must prevail In order to satisfy the primary objectives; that of accurate, consistent axis stability whilst the lens is being worn in a dynamic environment.

The toric lens according to the present invention satisfies most or all of the above criteria but also provides a built in latitude of axis location by usage of complex aspheric optical topography.

In its broadest form the present invention comprises:

a toric lens for axis mislocation correction having optical topography on the surfaces of the lens which induces a depth of field or depth of focus effect on the eye and enables theprincipal meridians of power on the lens to align with those on the eye of the wearer such that it neutralises mislocation error if the lens mislocates 1 degree or more said lens being thin enough to allow sufficient oxygen transmission therethrough to provide satisfactory morphology of the eye of a wearer.

Preferably the depth of field effect is produced by aspheric optical topography however the same or a similar effect may be produced by Spline Curve Functions, Diffractive Optics (by Eschelets or similar) or Ion implantation or similar or Bi-refringence optics.

Spline Curve Function is a method of describing a complex, non spherical curve via the use of weigh points or X Y co ordinates. A Spline curve is the smoothest possible curve between these points.

Diffractive optics are the reverse of refractive optics. Light entering the optical element is split (generally by ½ wave length) and then re continued at any given focal length. Miniature prisms or eschelets are used for this purpose.

Ion implantation is the implantation of one medium into another medium to change its physical characteristics. In an optical sense, implants a medium of a higher or lower refractive index in specific areas in order to specifically create different focal lengths. This can be achieved via the use of a particle accelerator or similar.

Bi-refringence is a phenomenon where a medium can have two focal lengths at the one time. In nature this occurs in crystals (which are naturally bi-refringent). So too is silicone which is why they make good computer chips. Specifically induced stress at opposing axis can induce bi-refringence in a number of elements.

The present invention will now be described in more detail and with reference to preferred but non limiting embodiments.

According to the invention, lenses are produced with an aspheric surface or surfaces with the nature and amount of asphericity being dictated by the depth of field effect required to neutralise the mislocation error. For a given toric lens power which creates a given amount of mislocation error an aspheric lens with the requisite depth of field effect will neutralise this mislocation.

For example, if an aspheric or multi-aspheric surfaces lens can create a depth of field effect on the eye of approximately plus or minus 1.50 spherical diopters and is manufactured in toric form and a spherical toric lens with a power of −2.00/−1.50×180 mislocates by 10 degrees from the required axis and therefore creates a mislocation error of +0.26/−0.25×130 then the depth of field effect of the aspheric toric lens will neutralize this error. −2.00 is the power in the meridian of the lens of 90° to 270° and in the meridian of 0°−180° the power is −3.50. −2.00/−1.50×180 may be written overall as −2.00/−3.50×180. The eye needs −2.00/−1.50×180 for perfect vision. When a lens with this power sits exactly on this axis i.e. 0 −180° this power requirement is fulfilled. If the meridians do not line up and an additional power over the top is needed to correct the eye, that power is called overrefraction. The overrefractions are simply resultant powers which occur when the lens mislocates and does not correct the eye's power.

If the lens power required was −3.50/−200×180 and the lens mislocated 10 degrees the resultant overrefraction would be +0.35/0.64×130 which again would be compensated for by the depth of field effect.

Even on a higher power lens such as a −5.00/−500×180 which swung 10 degrees where the mislocation error was +0.87/−1.74×130 the aspheric effect would compensate for most of this drop in refractive accuracy.

If for example this lens can be fitted for the distance power and can improve the depth of field effect by a total of 1.5 DS then any overrefraction, whether it be a simple crossed cylinder or a more complex lens over an under corrected or over corrected refraction, will be compensated by up to +0.75 in either spherical or cylindrical meridians for example +0.75/−1.50 (Composite Powers: not meridignal).

This concept therefore will apply to most astigmatic lenses which may swing off axis by reasonable amounts in the order of 10°−15°. The rule which will apply will obviously be that of higher cylinders being compensated when small amounts of mislocation occurs and smaller cylinders being compensated even when larger amounts of mislocation occur.

The advantage of this design however is that in most cases any swinging off axis in toric lenses presents the wearer with some form of visual compromise. Some manufacturers of stock toric lenses which do not exceed −2.00 D cylinders claim a 10 degree mislocation allowance is acceptable as the vision will only be comprised to a small extent. The design that is proposed here will negate this practice in that with low cylinders at 10 degrees mislocation there will be little or no drop in visual performance and that this built in visual compensation will extend to much larger cylinders and to greater amounts of axis mislocation.

It will therefore, theoretically, be possible to manufacture stock astigmatic lenses which have a cylinder power to greater than −2.50 D which can mislocate up to 30 degrees with little drop in visual performance.

The other advantage this design incorporates is that of manufacture. Toric lenses are by virtue of their complexity difficult to manufacture. The leads to a higher scrap rate and an end higher cost to the practitioner. They are much

I claim:

1. A toric lens for axis mislocation correction comprising a toric lens having optical topography on at least one surface of the lens which induces a depth of field effect on the eye and enables the principle meridians of power on the lens to align with those on the eye of a wearer such that the depth of field effect compensates for mislocation error if the lens mislocates 1 degree or more, said lens being thin enough to allow sufficient oxygen transmission therethrough to provide satisfactory morphology of the eye of a wearer.

2. A toric lens according to claim 1 wherein the optical topography which induces the depth of field effect comprises any one of aspheric topography, spline curve functions, diffractive optics using eschelets or bi-refringence optics.

3. A toric lens according to claim 2 wherein the topography is applied to the front surface of the lens.

4. A toric lens according to claim 1 wherein the optical topography is aspheric optical topography which compensates for axis mislocation greater than 10 degrees.

5. A toric lens according to claim 4 wherein the lens allows for compensation at a high cylinder power and/or at a low cylinder power at mislocation within the range of 10°−15°.

6. A toric lens according to claim 4 wherein the lens has a cylinder power to greater than −2.50 D and the lens can correct mislocation up to 30° with little drop in visual performance.

7. A toric lens according to claim 6 wherein for a spherical toric lens with a power of −2.0/−1.5×180 and which mislocates 10 degrees from the required axis and therefore creates a mislocation error of +0.26/−0.25×130, an aspheric toric lens having a depth of field effect on the eye of approximately plus or minus 1.5 spherical diopters will compensate this error.

8. A toric lens according to claim 6 wherein for a spherical toric lens with a power of −3.5/−200×180 and which mislocates 10 degrees from the required axis and therefore creates a mislocation error of 0.35/0.64×130, an aspheric toric lens having a depth of field effect on the eye of approximately plus or minus 1.5 spherical diopters will compensate this error.

9. A toric lens according to claim 6 wherein for a spherical toric lens with a power of −5.00/−500×180 and which mislocates 10 degrees from the required axis and therefore creates a mislocation error of 0.87/−1.74×130, an aspheric toric lens having a depth of field effect on the eye of approximately plus or minus 1.5 spherical diopters will compensate this error.

10. A toric lens according to claim 7 wherein the lens allows for compensation at a high cylinder power when a small amount of mislocation occurs and at a small cylinder power when a large amount of mislocation occurs.

11. A toric lens according to claim 10 wherein the lens compensates for mislocation error where the refractive error due to mislocation of the lens is not equal in two principal meridians of power.

12. A toric lens according to claim 11 wherein the lens thickness falls within the range of 0.15 mm to 0.25 mm.

13. A toric lens according to claim 8 wherein the lens allows for compensation at a high cylinder power when a small amount of mislocation occurs and at a small cylinder power when a large amount of mislocation occurs.

14. A toric lens according to claim 9 wherein the lens allows for compensation at a high cylinder power when a small amount of mislocation occurs and at a small cylinder power when a large amount of mislocation occurs.

15. A toric lens according to claim 13 wherein the lens compensates for mislocation error where the refractive error due to mislocation of the lens is not equal in two principal meridians of power.

16. A toric lens according to claim 14 wherein the lens compensates for mislocation error where the refractive error due to mislocation of the lens is not equal in two principal meridians of power.

17. A toric lens according to claim 15 wherein the lens thickness falls within the range of 0.15 mm to 0.25 mm.

18. A toric lens according to claim 16 wherein the lens thickness falls within the range of 0.15 mm to 0.25 mm.

19. An astigmatic lens which reduces axis mislocation comprising a toric lens having optical topography which induces a depth of field effect on the eye and enables the principle meridians of power on the lens to align with those on the eye of a wearer such that the depth of field effect induced by the optical topography is about plus or minus 1.5 spherical diopters to reduce mislocation error, said lens being thin enough to allow sufficient oxygen transmission therethrough to provide satisfactory morphology of the eye of a wearer.

20. An astigmatic lens as claimed in claim 19 wherein said optical topography comprises any one of aspheric topography, spline curve functions, diffractive optics using eschelets, ion implantation, or bi-refringence optics.

* * * * *